(12) United States Patent
Armijo et al.

(10) Patent No.: US 10,195,786 B1
(45) Date of Patent: Feb. 5, 2019

(54) FILAMENT HEATING IN 3D PRINTING SYSTEMS

(71) Applicant: Arevo, Inc., Milpitas, CA (US)

(72) Inventors: Armando Armijo, San Diego, CA (US); Chandrashekar Mantha, Santa Clara, CA (US)

(73) Assignee: Arevo, Inc., Milpitas, CA (US)

( * ) Notice: Subject to any disclaimer, the term of this patent is extended or adjusted under 35 U.S.C. 154(b) by 0 days.

(21) Appl. No.: 15/827,711

(22) Filed: Nov. 30, 2017

(51) Int. Cl.
*B33Y 50/00* (2015.01)
*B33Y 10/00* (2015.01)
*B29C 64/118* (2017.01)
*B29C 64/321* (2017.01)
*D02J 13/00* (2006.01)

(52) U.S. Cl.
CPC .......... *B29C 64/118* (2017.08); *B29C 64/321* (2017.08); *B33Y 10/00* (2014.12); *D02J 13/001* (2013.01)

(58) Field of Classification Search
CPC ................................. B33Y 50/00; B33Y 10/00
See application file for complete search history.

(56) References Cited

U.S. PATENT DOCUMENTS

| | | | |
|---|---|---|---|
| 5,552,097 A | 9/1996 | Schippers | |
| 9,249,527 B2 | 2/2016 | Lee et al. | |
| 2015/0266243 A1* | 9/2015 | Mark | B29C 70/20 425/143 |
| 2017/0090462 A1* | 3/2017 | Dave | B33Y 50/00 |

* cited by examiner

*Primary Examiner* — Matthew E. Hoban
(74) *Attorney, Agent, or Firm* — McGeary Cukor LLC; Jason Paul DeMont; Kenneth Ottesen

(57) ABSTRACT

A method of heating thermoplastic filament in additive manufacturing systems, such as 3D printing systems. In accordance with the illustrative embodiment of the present invention, the temporal rate $$\frac{dE}{dt}$$

at which heat dE is added to a portion of a segment of filament is a function of the temporal rate $$\frac{dm}{dt}$$

at which the mass dm of the portion of the segment of filament is deposited. In particular, the temporal rate $$\frac{dE}{dt}$$

at which heat dE is added to a portion of a segment of filament is a non-linear function of the temporal rate $$\frac{dm}{dt}.$$

19 Claims, 3 Drawing Sheets

FILAMENT HEATING IN 3D PRINTING SYSTEMS

FIELD OF THE INVENTION

The present invention relates to 3D printing, in general, and, more particularly, to a technique for controlling the temporal rate at which heat is added to filament in 3D printing systems.

BACKGROUND OF THE INVENTION

In general, there are two complementary approaches to manufacture an object: additive manufacturing and subtractive manufacturing.

Additive manufacturing involves aggregating material to form the desired object. In contrast, subtractive manufacturing involves removing material to form the desired object. In practice, many objects are manufactured using a combination of additive and subtractive techniques.

A form of additive manufacturing—colloquially known as "3D printing"—is the subject of intense research and development because it enables objects with complex geometries to be manufactured without molds or dies. Furthermore, 3D printing enables the mass customization of objects with different dimensions and characteristics. There remain, however, many challenges in the design, manufacture, and use of 3D printing systems.

SUMMARY OF THE INVENTION

The present invention provides a technique for heating a solid filament of thermoplastic in a 3D printing system without some of the costs and disadvantages for doing so in the prior art.

One type of 3D printing system that uses a solid filament of thermoplastic is "fused-deposition modeling." In fused-deposition modeling, a solid filament of thermoplastic is fed into a heated reservoir and melted to form a supply of molten thermoplastic. As the printer head moves from place to place, the molten thermoplastic is extruded to form the desired object. As molten thermoplastic is removed from the reservoir, solid filament is fed into the reservoir and melted to replenish the supply of molten thermoplastic.

The temporal rate $$\frac{dm_{out}}{dt}$$

at which the mass $dm_{out}$ of molten thermoplastic is extruded is not constant (i.e., $$\left(\text{i.e., } \frac{dm_{out}^2}{d^2t} \neq 0\right).$$

On the contrary, as the printing head starts, stops, accelerates, decelerates, and moves, and the extrusion of thermoplastic also starts and stops, the temporal rate $$\frac{dm_{out}}{dt}$$

at which thermoplastic is extruded also varies.

Some fused-filament 3D printing systems attempt to ensure that the printing head always has an adequate supply of molten thermoplastic, and, therefore, the temporal rate $$\frac{dm_{in}}{dt}$$

at WHIM the mass $dm_{in}$ of solid filament is fed into the heated reservoir is moderated so that, on average, it approximately equals the temporal rate $$\frac{dm_{out}}{dt}$$

at which molten thermoplastic is extruded (i.e., $$\left(\text{i.e., } \frac{dm_{in}}{dt} \approx \frac{dm_{out}}{dt}\right).$$

If the temporal rate $$\frac{dm_{in}}{dt}$$

at which solid filament is fed into the heated reservoir is greater than, on average, the temporal rate $$\frac{dm_{out}}{dt}$$

at which molten thermoplastic is extruded (i.e., $$\left(\text{i.e., } \frac{dm_{in}}{dt} > \frac{dm_{out}}{dt}\right),$$

then the reservoir of molten thermoplastic would occasionally overflow. In contrast, if the temporal rate $$\frac{dm_{in}}{dt}$$

at which solid filament is fed into the heated reservoir is less than, on average, the temporal rate $$\frac{dm_{out}}{dt}$$

at which molten thermoplastic is extruded (i.e., $$\left(\text{i.e., } \frac{dm_{in}}{dt} < \frac{dm_{out}}{dt}\right),$$

then the reservoir of molten thermoplastic would occasionally run dry.

Regardless of the relationship of the temporal rate $$\frac{dm_{in}}{dt}$$

to the temporal rate $$\frac{dm_{out}}{dt},$$

the temporal rate $$\frac{dE}{dt}$$

at which heat is added to the reservoir is constant (i.e., $$\left(\text{i.e., } \frac{dE^2}{d^2t} = 0\right)$$

and is generally based on the maximum rate $$\frac{dm_{out}}{dt}$$

at which thermoplastic can be extruded, the temporal rate at which the supply of molten thermoplastic cools, and other factors. In general, adding heat dE to the reservoir at a constant temporal rate $$\frac{dE}{dt}$$

is acceptable because the molten thermoplastic in the reservoir can function over a relatively wide temperature range.

In contrast, the operation of the illustrative embodiment is different. In accordance with the illustrative embodiment, segments of solid filament of thermoplastic—of varying length—are heated but only so much as necessary to make them pliable and adhesive, and the heated segments are guided and pressed into position to form the desired object. Typically, only a short portion of the segment (e.g., ≤10 mm, etc.) is heated at once and the heating of the portion of the segment occurs immediately before the portion of the segment is guided and pressed into position.

In accordance with the illustrative embodiment, the acceptable temperature range for the portion of the segment of filament is very narrow. If the thermoplastic is too cool, it is not sufficiently pliable or adhesive, and if the thermoplastic is too hot, it melts and its viscosity becomes too low. Therefore, the amount of heat dE and the temporal rate $$\frac{dE}{dt}$$

at which heat is added to the filament must be carefully controlled.

In accordance with the illustrative embodiment, the deposition head starts, stops, accelerates, decelerates, turns corners, and moves, and the deposition of segments of filament also starts and stops, and, therefore, the temporal rate $$\frac{dm}{dt}$$

at which the mass dm of filament is deposited varies (i.e., $$\left(\text{i.e., } \frac{dm^2}{d^2t} \ne 0\right).$$

To ensure that the portion of the segment of filament is heated to the correct temperature range, however, the temporal rate $$\frac{dE}{dt}$$

at which heat dE is added to a portion of a segment of filament is not constant (i.e., $$\left(\text{i.e., } \frac{dE^2}{d^2t} \ne 0\right).$$

Instead, and in accordance with the illustrative embodiment of the present invention, the temporal rate $$\frac{dE}{dt}$$

at which heat dE is added to a portion of a segment of filament is a function of the temporal rate $$\frac{dm}{dt}$$

at which the mass dm of the portion of the segment of filament is deposited:

$$\frac{dE}{dt} = f\left(\frac{dm}{dt}\right) \quad \text{(Eq. 1a)}$$

or $$\frac{\Delta E}{\Delta t} = f\left(\frac{\Delta m}{\Delta t}\right) \quad \text{(Eq. 1b)}$$

for short time intervals in discrete-time systems (e.g., Δt≤50 milliseconds, Δt≤25 milliseconds, Δt≤10 milliseconds, etc.).

Although the temporal rate $$\frac{dE}{dt}$$

at which heat dE is added to the portion of the segment of filament can be a linear function of the temporal rate $$\frac{dm}{dt}$$

at which the mass dm of the portion of the segment of filament is deposited:

$$\frac{dE}{dt} = a_1\left(\frac{dm}{dt}\right) + a_0 \qquad \text{(Eq. 2a)}$$

or $$\frac{\Delta E}{\Delta t} = a_1\left(\frac{\Delta m}{\Delta t}\right) + a_0, \qquad \text{(Eq. 2b)}$$

where $a_1$ and $a_0$ are real numbers, a linear function produces less-than-desirable results. This is at least partially due to the non-linear temporal rate at which the portion of the segment of filament cools.

Therefore, in accordance with the illustrative embodiment, the quality of the manufactured object is enhanced when a second-or-higher-order polynomial function is used:

$$\frac{dE}{dt} = a_m\left(\frac{dm}{dt}\right)^n + a_{n-1}\left(\frac{dm}{dt}\right)^{n-1} + \ldots + a_1\left(\frac{dm}{dt}\right) + a_0 \qquad \text{(Eq. 3a)}$$

or $$\frac{\Delta E}{\Delta t} = a_n\left(\frac{\Delta m}{\Delta t}\right)^n + a_{n-1}\left(\frac{\Delta m}{\Delta t}\right)^{n-1} + \ldots + a_1\left(\frac{\Delta m}{\Delta t}\right) + a_0 \qquad \text{(Eq. 3b)}$$

wherein n is a positive integer greater than 1, $a_0, a_1, \ldots, a_{n-1}, a_n$, are real numbers for all n, and $a_n \neq 0$. This ensures that the portion of the segment of thermoplastic is precisely and quickly heated—but not overheated—to the acceptable temperature range and remains in the acceptable temperature range until it is guided and pressed into position.

In accordance with the illustrative embodiment, Equations 3a and 3b have a value of n=2 (i.e., a quadratic function). Although the coefficient $a_1$ might be larger—even considerably larger—than the coefficient $a_2$, the quality of manufactured objects is enhanced when the coefficient $a_2 > 0$.

It will be clear to those skilled in the art, after reading this disclosure, how to make and use alternative embodiments of the present invention in which other non-linear functions reasonably approximate—over the range of interest—the quadratic function, and, therefore, it will be clear to those skilled in the art, after reading this disclosure, how to make and use alternative embodiments of Equations 3a and 3b in which n=3 (i.e., a cubic function), n=4 (i.e., a quartic function) or n=5 (i.e., a quintic function).

The values of the coefficients $a_0, a_1, \ldots, a_{n-1}, a_n$ depend on the material properties of the filament, the properties of the heat source (e.g., hot gas, laser, induction, microwave, etc.), the temperature of the filament before heat is applied, the ambient temperature, the temperature of the object to which the filament is being deposited, the temporal rate at which the temperature of the filament increases with the temporal rate at which heat energy is absorbed by the filament, the temporal rate at which the temperature of the filament cools, and other process parameters. Although the values of the coefficients can be determined theoretically, in accordance with the illustrative embodiment of the present invention, they are determined empirically through trial and error.

Furthermore, it will be clear to those skilled in the art, after reading this disclosure, how to make and use alternative embodiments of the present invention in which the temporal rate $$\frac{dE}{dt}$$

at which heat dE is added to the portion of the segment of filament approximates an exponential function of the temporal rate $$\frac{dm}{dt}$$

at which the mass dm of the portion of the segment of filament is deposited. For example:

$$\frac{dE}{dt} = ae^{b\frac{dm}{dt}} + c\frac{dm}{dt} + d \qquad \text{(Eq. 4a)}$$

or $$\frac{\Delta E}{\Delta t} = ae^{b\frac{\Delta m}{\Delta t}} + c\frac{\Delta m}{\Delta t} + d \qquad \text{(Eq. 4b)}$$

wherein a, b, c, and d are real numbers, $a \neq 0$, $b \neq 0$, and $c \neq 0$.

The illustrative embodiment comprises:

depositing a portion of a segment of thermoplastic filament having a mass dm at a temporal rate $$\frac{dm}{dt};$$

and adding heat dE to the portion of the segment of thermoplastic filament at a temporal rate $$\frac{dE}{dt}$$

equal to:

$$\frac{dE}{dt} = a_n\left(\frac{dm}{dt}\right)^n + a_{n-1}\left(\frac{dm}{dt}\right)^{n-1} + \ldots + a_1\left(\frac{dm}{dt}\right) + a_0;$$

wherein n is a positive integer greater than 1, $a_0, a_1, \ldots, a_{n-1}, a_n$ are real numbers for all n, and $a_n \neq 0$.

DETAILED DESCRIPTION OF THE INVENTION

Figure 1:
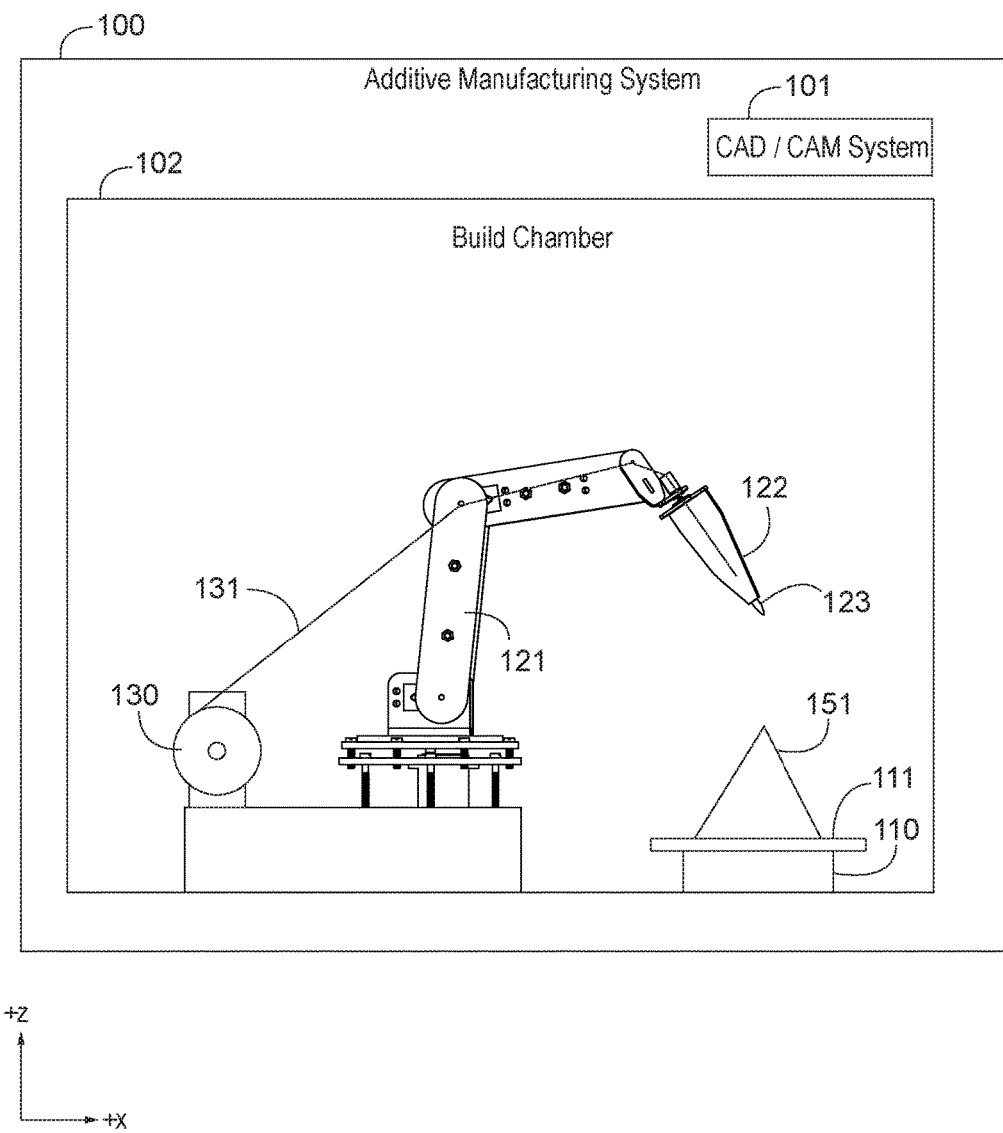
FIG. 1 depicts an illustration of the salient components of additive manufacturing system 100 in accordance with the illustrative embodiment of the present invention.

FIG. 1 depicts an illustration of the salient components of additive manufacturing system 100 in accordance with the illustrative embodiment of the present invention. Additive manufacturing system 100 comprises: CAD/CAM system 101, build chamber 102, turn-table 110, deposition build plate 111, robotic arm 121 (which itself comprises deposition head 122 and roller 123), thermoplastic filament spool 130, and thermoplastic filament 131. The purpose of manufacturing system 100 is to manufacture object 151.

Figure 2:
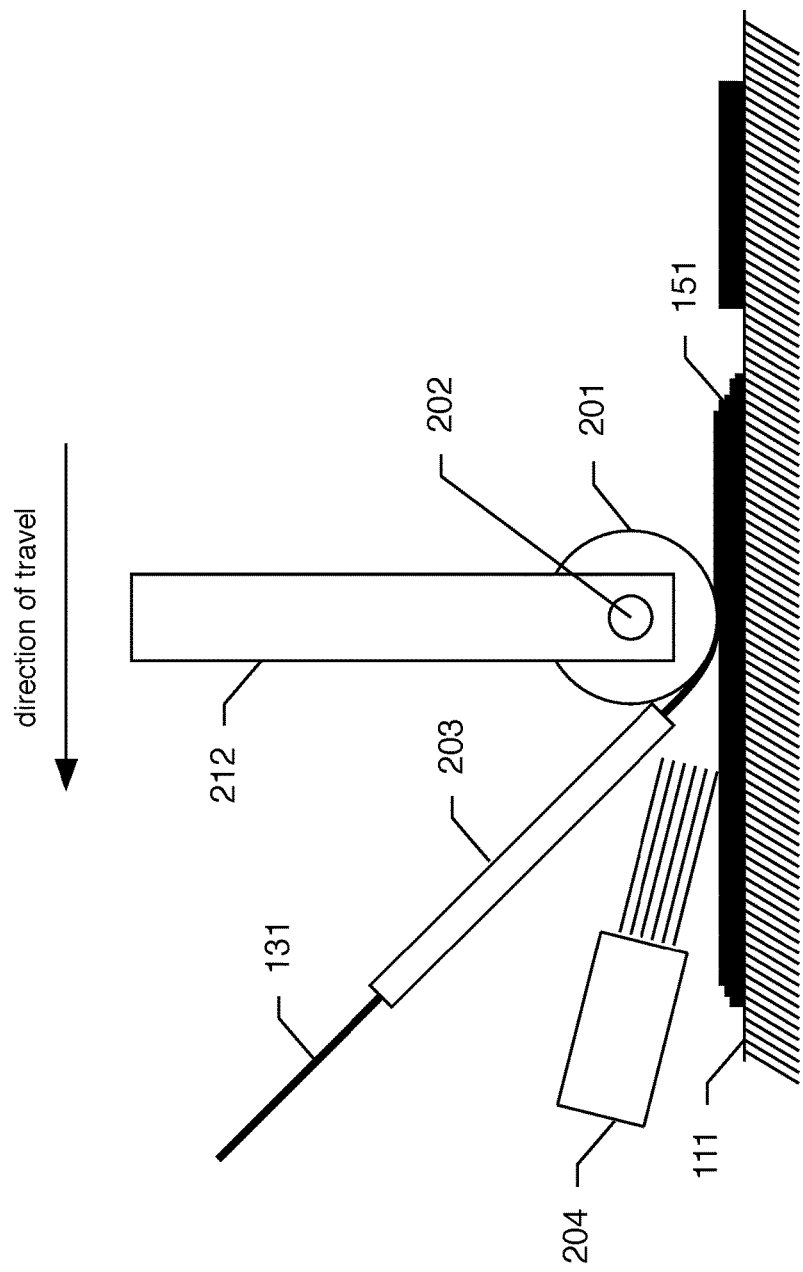
FIG. 2 depicts an illustration of the salient components of additive manufacturing system 100 that heat and deposition thermoplastic filament in accordance with the illustrative embodiment of the present invention.

CAM controller 101 comprises the hardware and software necessary to direct build chamber 102, control robotic arm 121, deposition head 122 (including laser 204, which is shown in FIG. 2), roller 123, and turntable 110 to manufacture object 151. It will be clear to those skilled in the art, after reading this disclosure, how to make and use CAM controller 101.

Build chamber 102 is a thermally-insulated, temperature-controlled environment in which object 151 is manufactured. It will be clear to those skilled in art how to make and use build chamber 102.

Turn-table 110 comprises a stepper motor under the control of CAM controller 101 that is capable of rotating build plate 111 (and, consequently object 151) around the Z-axis. In particular, turn-table 110 is capable of:
  i. rotating build plate 111 clockwise around the Z-axis from any angle to any angle, and
  ii. rotating build plate 111 counter-clockwise around the Z-axis from any angle to any angle, and
  iii. rotating build plate 111 at any rate, and
  iv. maintaining (statically) the position of build plate 111 at any angle.

It will be clear to those skilled in the art how to make and use turn-table 110.

Build plate 111 comprises hardware on which object 151 is manufactured. It will be clear to those skilled in the art how to make and use build plate 111.

Robotic arm 121 is a seven-axis arm capable of placing roller 123 at any location in the build volume of object 151 and from any approach angle. Furthermore, robotic arm can move roller 123 in:
  i. the +X direction,
  ii. the −X direction,
  iii. the +Y direction,
  iv. the −Y direction,
  v. the +Z direction,
  vi. the −Z direction, and
  vii. any combination of i, ii, iii, iv, v, and vi while rotating the approach angle of roller 123 around any point or temporal series of points. It will be clear to those skilled in the art how to make and use robotic arm 121.

Deposition head 122 is hardware that heats and deposits filament 131 (which may partially or wholly contain one or more fiber strands) via roller 123.

Thermoplastic filament 131 comprises chopped carbon fiber, but it will be clear to those skilled in the art, after reading this disclosure, how to make and use alternative embodiments of the present invention in which thermoplastic filament 131 has a different fiber composition as described in U.S. patent application Ser. No. 14/184,010, which is incorporated by reference.

In accordance with the illustrative embodiment, filament 131 comprises a cylindrical towpreg of continuous 12K carbon fiber impregnated with thermoplastic resin.

It will be clear to those skilled in the art, after reading this disclosure, how to make and use alternative embodiments of the present invention in which filament 131 comprises chopped fibers. It will be clear to those skilled in the art, after reading this disclosure, how to make and use alternative embodiments of the present invention in which filament 131 comprises a different number of fibers (e.g., 1K, 3K, 6K, 24K, etc.). It will be clear to those skilled in the art, after reading this disclosure, how to make and use alternative embodiments of the present invention in which the fibers in filament 131 are made of a different material (e.g., fiberglass, aramid, carbon nanotubes, etc.).

In accordance with the illustrative embodiment, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK).

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC).

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed object.

In some alternative embodiment of the present invention, the filament comprises a metal. For example, and without limitation, the filament can be a wire comprising stainless steel, inconel (nickel/chrome), titanium, aluminum, cobalt chrome, copper, bronze, iron, precious metals (e.g., platinum, gold, silver, etc.).

FIG. 2 depicts a schematic representation of the spatial relationship of the salient components of deposition head 122 to a segment of thermoplastic filament 131, a previously-deposited segment of that heat and deposit segments of thermoplastic filament 131. In accordance with the illustrative embodiment, the salient components of deposition head 122 comprises: roller 201, roller axle 202, filament guide 203, laser 204, and roller guide 212.

In accordance with the illustrative embodiment, roller 201, roller axle 202, filament guide 203, laser 204, and roller guide 212 are held in relative position by a support structure that is not shown in FIG. 2. Furthermore, in accordance with the illustrative embodiment, the relative spatial position of roller 201, roller axle 202, filament guide 203, laser 204, and roller guide 212 are invariant, but it will be clear to those skilled in the art, after reading this disclosure, in which the relative spatial position of them is not invariant.

Roller 201 is a metal wheel with roller bearings on roller axle 202 that is positioned by roller guide 212. In accordance with the illustrative embodiment, roller 201 rotates freely on roller axle 202 and presses filament 131 into previously-deposited filament 151. Filament 131 is pressed into previously-deposited filament 151 to facilitate adhesion and eliminate voids.

Roller axle 202 is metal around which roller 201 rotates freely. It will be clear to those skilled in the art how to make and use roller axle 202.

Filament guide 203 guides filament 131 into position so that roller 201 can press it into previously-deposited filament 151. Filament guide 203 guides filament 131 both laterally and vertically. At least a portion of filament guide 203 is transparent—or substantially transparent—to the light from laser 204 so that laser 204 can add heat to filament 131 while filament 131 is within filament guide 203. The details of filament guide 203 are taught in co-pending U.S. patent application Ser. No. 15/827,721, entitled "Filament Guide," filed on Nov. 30, 2017, which is incorporated by reference for the purposes of disclosing how it is made and used in conjunction with the deposition of heated filaments of thermoplastic.

Laser 204 is a Laserline LDM-800 diode laser that heats both a portion of a segment of filament 131 and a portion of a segment of previously-deposited filament 151 under the control of CAM controller 101. It will be clear to those skilled in the art, after reading this disclosure, how to make alternative embodiments of the present invention that use a different laser.

In accordance with the illustrative embodiment, the amount of heat added to the portion of the segment of filament 131 and the portion of the segment of previously-deposited filament 151 can be instantaneously—or at least very quickly—moderated by CAM controller 101, and it is well-known to those skilled in the art how to control laser 204 to moderate rate $$\frac{dE}{dt}$$

at which heat dE is added to the portion of the segment of filament 131.

In particular, and in accordance with the illustrative embodiment, the temporal rate $$\frac{dE}{dt}$$

at which heat dE is added to the portion of the segment of filament 131 is a function of the temporal rate $$\frac{dm}{dt}$$

at which the mass dm of the portion of the segment of filament 131 is deposited:

$$\frac{dE}{dt} = f\left(\frac{dm}{dt}\right) \qquad (\text{Eq. 1a})$$

or $$\frac{\Delta E}{\Delta t} = f\left(\frac{\Delta m}{\Delta t}\right) \qquad (\text{Eq. 1b})$$

for short time intervals in discrete-time systems (e.g., $\Delta t \leq 10$ milliseconds, $\Delta t \leq 5$ milliseconds, $\Delta t \leq 2.5$ milliseconds, etc.).

CAM controller 101 does not directly measure the temporal rate $$\frac{dm}{dt}$$

at which the mass of the portion of the segment of filament 131 is deposited. Instead, CAM controller 101 uses the measurement of a proxy—the linear temporal rate $$\frac{dL}{dt}$$

at which filament is deposited as measured by the relative motion of deposition head 122 relative to build surface 111—as indicative of the temporal rate $$\frac{dm}{dt}$$

at which the mass of the portion of the segment of filament is deposited. This is reasonable because—in accordance with the illustrative embodiment—filament 131 has a uniform mass per linear L meter of filament, and, therefore, the linear temporal rate $$\frac{dL}{dt}$$

at which filament is deposited is proportional to the temporal rate $$\frac{dm}{dt}:$$

$$\frac{dL}{dt} \propto \frac{dm}{dt} \quad \text{(Eq. 4)}$$

In accordance with the illustrative embodiment of the present invention, the temporal rate $$\frac{dE}{dt}$$

at which the heat is added to the filament is a second-order polynomial function of the temporal rate $$\frac{dm}{dt}$$

at which the mass of the filament is deposited:

$$\frac{dE}{dt} = a_2\left(\frac{dm}{dt}\right)^2 + a_1\left(\frac{dm}{dt}\right) + a_0 \quad \text{(Eq. 3a)}$$

or $$\frac{\Delta E}{\Delta t} = a_2\left(\frac{\Delta m}{\Delta t}\right)^2 + a_1\left(\frac{\Delta m}{\Delta t}\right) + a_0 \quad \text{(Eq. 3b)}$$

wherein $a_0$, $a_1$, and $a_2$ are real numbers and $a_2 \neq 0$, and $\Delta t \leq 50$ milliseconds.

The values of the coefficients $a_0$, $a_1$, and $a_2$ depend on the material properties of the filament, the properties of the heat source (e.g., hot gas, laser, induction, microwave, etc.), the temperature of the filament before heat is applied, the ambient temperature, the temperature of the object to which the filament is being deposited, the temporal rate at which the temperature of the filament increases with the temporal rate at which heat energy is absorbed by the filament, the temporal rate at which the temperature of the filament cools, and other process parameters. Although the values of the coefficients can be determined theoretically, in accordance with the illustrative embodiment of the present invention, they are determined empirically through trial and error.

Figure 3:
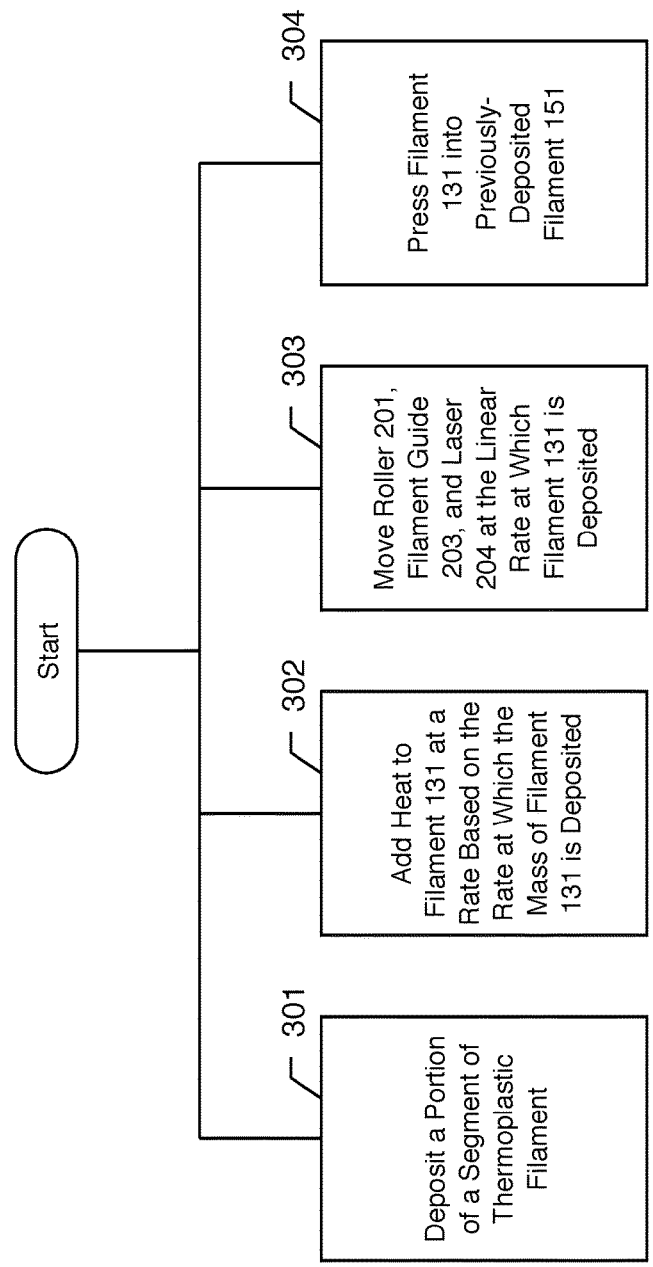
FIG. 3 depicts a flowchart of the salient tasks performed by the illustrative embodiment of the present invention.

FIG. 3 depicts a flowchart of the operation of the illustrative embodiment of the present invention. In accordance with the illustrative embodiment, tasks 301, 302, 303, and 304 are all performs concurrently, albeit on successive portions of a segment of filament 131.

At task 301, deposition head 122 deposits a portion of a segment of filament 131. The portion of the segment of filament 131 has a mass dm.

At task 302, laser 204 adds heat dE to a portion of a segment of filament 131 as described above while a previously-heated portion of the segment of filament 131 is being pressed into position by roller 201.

At task 303, deposition head 122 moves roller 201, filament guide 203, and laser 204 at the linear temporal rate $$\frac{dL}{dt}$$

at which a portion of the segment of filament 131 is deposited and pressed under roller 201.

At task 304, roller 201 presses a previously-heated portion of the segment of filament 131 into a previously-deposited filament 151.

DEFINITIONS

For the purposes of this specification, the term "filament" is defined as a slender threadlike object thermoplastic that might or might not comprise a non-thermoplastic reinforcing material (e.g., a fiber, metal, etc.). It should be noted that there is no particular length associated with the term "filament."

It is to be understood that the disclosure describes a few embodiments and that many variations of the invention can easily be devised by those skilled in the art after reading this disclosure and that the scope of the present invention is to be determined by the following claims.

What is claimed is:
1. A method comprising:
  depositing a portion of a segment of thermoplastic filament having a mass dm at a temporal rate

$$\frac{dm}{dt};$$

and
  adding heat dE to the portion of the segment of thermoplastic filament at a temporal rate $$\frac{dE}{dt}$$

that is a non-linear function of the temporal rate $$\frac{dm}{dt}$$

and equal to:

$$\frac{dE}{dt} = a_n\left(\frac{dm}{dt}\right)^n + a_{n-1}\left(\frac{dm}{dt}\right)^{n-1} + \ldots + a_1\left(\frac{dm}{dt}\right) + a_0;$$

wherein n is a positive integer greater than 1, $a_0, a_1, \ldots, a_{n-1}, a_n$ are real numbers for all n, and $a_n \neq 0$.

2. The method of claim 1 wherein n=2.
3. The method of claim 1 wherein n=3.
4. The method of claim 1 wherein n=4.
5. The method of claim 1 wherein the segment of thermoplastic filament comprises a carbon fiber.

6. The method of claim 1 wherein the segment of thermoplastic filament comprises a metal strand.

7. The method of claim 1 wherein adding heat dE comprises exposing the portion of the segment of thermoplastic filament to a laser.

8. A method comprising:
depositing a portion of a segment of thermoplastic filament having a mass $\Delta m$ at a temporal rate $$\frac{\Delta m}{\Delta t};$$

and
adding heat $\Delta E$ to the portion of the segment of thermoplastic filament at a temporal rate $$\frac{\Delta E}{\Delta t}$$

that is a non-linear function of the temporal rate $$\frac{\Delta m}{\Delta t}$$

and equal to:

$$\frac{\Delta E}{\Delta t} = a_n \left(\frac{\Delta m}{\Delta t}\right)^n + a_{n-1}\left(\frac{\Delta m}{\Delta t}\right)^{n-1} + \ldots + a_1\left(\frac{\Delta m}{\Delta t}\right) + a_0;$$

wherein n is a positive integer greater than 1, $a_0, a_1, \ldots, a_{n-1}, a_n$ are real numbers for all n, $a_n \neq 0$, and $\Delta t \leq 50$ milliseconds.

9. The method of claim 8 wherein n=2.

10. The method of claim 8 wherein n=3.

11. The method of claim 8 wherein n=4.

12. The method of claim 8 wherein the segment of thermoplastic filament comprises a carbon fiber.

13. The method of claim 8 wherein the segment of thermoplastic filament comprises a metal strand.

14. The method of claim 8 wherein adding heat $\Delta E$ comprises exposing the portion of the segment of thermoplastic filament to a laser.

15. A method comprising:
depositing a portion of a segment of thermoplastic filament having a mass dm at a temporal rate $$\frac{dm}{dt};$$

and
adding heat dE to the portion of the segment of thermoplastic filament at a temporal rate $$\frac{dE}{dt}$$

that is a non-linear function of the temporal rate $$\frac{dm}{dt}$$

and equal to at least a second-order polynomial function of the temporal rate $$\frac{dm}{dt};$$

wherein the segment of thermoplastic filament comprises a carbon fiber.

16. The method of claim 15 wherein adding heat dE comprises exposing the portion of the segment of thermoplastic filament to a laser.

17. The method of claim 15 wherein the second-order polynomial function comprises coefficients whose values depend on material properties of the thermoplastic filament.

18. The method of claim 1 wherein $a_0, a_1, \ldots, a_{n-1}, a_n$ have values that depend on material properties of the thermoplastic filament.

19. The method of claim 8 wherein $a_0, a_1, \ldots, a_{n-1}, a_n$ have values that depend on material properties of the thermoplastic filament.

* * * * *